US012633531B2

(12) United States Patent (10) Patent No.: US 12,633,531 B2
Tabushi et al. (45) Date of Patent: May 19, 2026

(54) POSITIVE ELECTRODE AND NONAQUEOUS ELECTROLYTE SECONDARY BATTERY USING THE SAME

(71) Applicant: Prime Planet Energy & Solutions, Inc., Tokyo (JP)

(72) Inventors: Akihiro Tabushi, Kasai (JP); Takatoshi Higuchi, Kakogawa (JP); Masaya Saito, Kasai (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 613 days.

(21) Appl. No.: 18/067,724

(22) Filed: Dec. 19, 2022

(65) Prior Publication Data

US 2023/0197944 A1 Jun. 22, 2023

(30) Foreign Application Priority Data

Dec. 20, 2021 (JP) ................................. 2021-206370

(51) Int. Cl.
　*H01M 4/505* (2010.01)
　*H01M 4/02* (2006.01)
　　　(Continued)

(52) U.S. Cl.
　CPC ........... *H01M 4/505* (2013.01); *H01M 4/525* (2013.01); *H01M 10/0525* (2013.01); *H01M 2004/021* (2013.01); *H01M 2004/028* (2013.01)

(58) Field of Classification Search
　CPC .............................. H01M 4/505; H01M 4/525
　See application file for complete search history.

(56) References Cited

U.S. PATENT DOCUMENTS

2010/0112449 A1 5/2010 Fujita et al.
2011/0129734 A1 6/2011 Konishi et al.
(Continued)

FOREIGN PATENT DOCUMENTS

CN 111837268 A 10/2020
CN 112038611 A 12/2020
(Continued)

OTHER PUBLICATIONS

JP-2003221236-A Translation from Espacenet (Year: 2003).*

*Primary Examiner* — Nathanael T Zemui
(74) *Attorney, Agent, or Firm* — HAUPTMAN HAM, LLP

(57) ABSTRACT

Provided is a positive electrode that can provide a nonaqueous electrolyte secondary battery with high gas generation suppressing performance during storage and high cycle characteristics. The positive electrode disclosed here includes a positive electrode current collector and a positive electrode active material layer supported by the positive electrode current collector. The positive electrode active material layer includes monoparticulate first Ni-containing lithium composite oxide particles and secondary particulate second Ni-containing lithium composite oxide particles. The first Ni-containing lithium composite oxide particles and the second Ni-containing lithium composite oxide particles have layered crystal structures. The first Ni-containing lithium composite oxide particles have an average particle size (D50) of 2 μm to 6 μm. The second Ni-containing lithium composite oxide particles have an average primary particle size of 1.2 μm to 2.0 μm. The second Ni-containing lithium composite oxide particles have an average particle size (D50) of 12 μm to 20 μm.

7 Claims, 3 Drawing Sheets

(51) Int. Cl.
  *H01M 4/525*      (2010.01)
  *H01M 10/0525*    (2010.01)

(56)           References Cited

U.S. PATENT DOCUMENTS

| | | | |
|---|---|---|---|
| 2015/0010819 A1 | 1/2015 | Lee et al. | |
| 2017/0288223 A1 | 10/2017 | Ogawa et al. | |
| 2019/0305300 A1 | 10/2019 | Hashimoto | |
| 2020/0161650 A1* | 5/2020 | Park | C01G 53/82 |
| 2021/0013508 A1 | 1/2021 | Kuroda | |
| 2021/0050588 A1 | 2/2021 | Oki et al. | |
| 2021/0083286 A1 | 3/2021 | Kuroda et al. | |
| 2021/0296638 A1 | 9/2021 | Kintsu et al. | |
| 2022/0029158 A1 | 1/2022 | Takamori | |
| 2022/0149366 A1 | 5/2022 | Watanabe et al. | |
| 2023/0047021 A1 | 2/2023 | Yamamoto et al. | |
| 2023/0155123 A1* | 5/2023 | Lee | C01G 53/50 |
| | | | 429/223 |
| 2023/0246168 A1 | 8/2023 | Sakitani et al. | |

FOREIGN PATENT DOCUMENTS

| | | | | |
|---|---|---|---|---|
| CN | 113330603 A | | | 8/2021 |
| CN | 113410428 A | | | 9/2021 |
| EP | 4039651 A | | | 8/2022 |
| JP | 2003-017056 A | | | 1/2003 |
| JP | 2003221236 A | * | | 8/2003 |
| JP | 2008293875 A | | | 12/2008 |
| JP | 2011113825 A | | | 6/2011 |
| JP | 2014-067546 A | | | 4/2014 |
| JP | 2015-018803 A | | | 1/2015 |
| JP | 2017188445 A | | | 10/2017 |
| JP | 2019160571 A | | | 9/2019 |
| JP | 2019175721 A | | | 10/2019 |
| JP | 2020-087879 A | | | 6/2020 |
| JP | 2020100549 A | | | 7/2020 |
| WO | 2008/120442 A1 | | | 10/2008 |
| WO | 2019/163483 A1 | | | 8/2019 |
| WO | 2021065162 A1 | | | 4/2021 |
| WO | 2021/153397 A1 | | | 8/2021 |
| WO | 2022/044935 A1 | | | 3/2022 |

* cited by examiner

POSITIVE ELECTRODE AND NONAQUEOUS ELECTROLYTE SECONDARY BATTERY USING THE SAME

TECHNICAL FIELD

The present disclosure relates to a positive electrode. The present disclosure also relates to a nonaqueous electrolyte secondary battery using the positive electrode. This application claims the benefit of priority to Japanese Patent Application No. 2021-206370 filed on Dec. 20, 2021. The entire contents of this application are hereby incorporated herein by reference.

BACKGROUND

Recently, nonaqueous electrolyte secondary batteries such as lithium ion secondary batteries are suitably used for, for example, portable power supplies for devices such as personal computers and portable terminals, and vehicle driving power supplies for vehicles such as battery electric vehicles (BEV), hybrid electric vehicles (HEV), and plug-in hybrid electric vehicles (PHEV).

With widespread use of nonaqueous electrolyte secondary batteries, these batteries are required of further enhanced performance. A positive electrode of a nonaqueous electrolyte secondary battery generally employs a lithium composite oxide as a positive electrode active material. To enhance performance of a nonaqueous electrolyte secondary battery, a technique of mixing two types of lithium composite oxides having different particle properties (see, for example, Patent Documents 1 and 2) is known. In Patent Documents 1 and 2, a monoparticulate lithium composite oxide and an agglomerated (i.e., secondary) particulate lithium composite oxide are used.

CITATION LIST

Patent Documents

Patent Document 1: WO2021/065162
Patent Document 2: JP2019-160571A

SUMMARY

An example of performance of a nonaqueous electrolyte secondary battery required for enhancement is a volume energy density. An example method for increasing the volume energy density is to increase the density of a positive electrode active material layer including a positive electrode active material. Inventors of the present disclosure intensively studied the method to find that in the case of using a monoparticulate lithium composite oxide and a secondary particulate lithium composite oxide as positive electrode active materials and performing press treatment on the positive electrode active material layer under a pressure higher than that in a conventional method in order to further increase the density, a large number of cracks occur in secondary particles so that the amount of gas generated during storage of the nonaqueous electrolyte secondary battery increases, which is problematic. On the other hand, the nonaqueous electrolyte secondary battery is required to have high cycle characteristics.

It is therefore an object of the present disclosure to provide a positive electrode that can provide a nonaqueous electrolyte secondary battery with high gas generation suppressing performance during storage and high cycle characteristics.

A positive electrode disclosed here includes: a positive electrode current collector; and a positive electrode active material layer supported by the positive electrode current collector. The positive electrode active material layer includes monoparticulate first Ni-containing lithium composite oxide particles and secondary particulate second Ni-containing lithium composite oxide particles. The first Ni-containing lithium composite oxide particles and the second Ni-containing lithium composite oxide particles have layered crystal structures. The first Ni-containing lithium composite oxide particles have an average particle size (D50) of 2 μm to 6 μm. The second Ni-containing lithium composite oxide particles have an average primary particle size of 1.2 μm to 2.0 μm. The second Ni-containing lithium composite oxide particles have an average particle size (D50) of 12 μm to 20 μm.

With this configuration, it is possible to provide a positive electrode that can provide a nonaqueous electrolyte secondary battery with high gas generation suppressing performance during storage and high cycle characteristics.

In a desired aspect of the positive electrode disclosed here, the positive electrode active material layer has a density of 3.00 g/cm$^3$ to 4.00 g/cm$^3$. This configuration can provide the nonaqueous electrolyte secondary battery with an especially high volume energy density. In addition, it is possible to obtain higher gas generation suppression during storage of the nonaqueous electrolyte secondary battery.

In a desired aspect of the positive electrode disclosed here, after the second Ni-containing lithium composite oxide particles are press-molded for 30 seconds under a load of 70 kN into a cylinder shape of Φ (diameter) 19 mm×4.0 mm to 4.5 mm and then disintegrated, the second lithium composite oxide particles have a BET specific surface area of 0.41 m$^2$/g or more and 0.48 m$^2$/g or less. This configuration can further enhance gas generation suppressing performance during storage of the nonaqueous electrolyte secondary battery and cycle characteristics.

In a desired aspect of the positive electrode disclosed here, each of the first Ni-containing lithium composite oxide particles and the second Ni-containing lithium composite oxide particles is particles of a lithium nickel cobalt manganese composite oxide. This configuration can provide the nonaqueous electrolyte secondary battery with more excellent battery characteristics such as small initial resistance.

In a more desired aspect of the positive electrode disclosed here, a content of nickel in all metal elements except for lithium in the lithium nickel cobalt manganese composite oxide is 50 mol % or more. This configuration can provide the nonaqueous electrolyte secondary battery with an especially high volume energy density.

In another aspect, a nonaqueous electrolyte secondary battery disclosed here includes the positive electrode described above, a negative electrode, and a nonaqueous electrolyte. This configuration can provide a nonaqueous electrolyte secondary battery having high gas generation suppressing performance during storage and high cycle characteristics.

DETAILED DESCRIPTION

Figure 1:
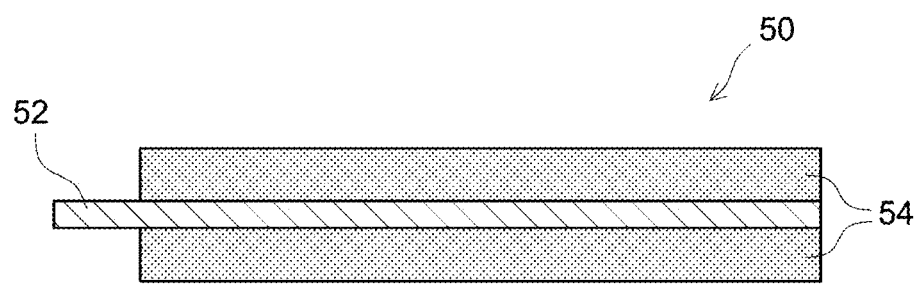
FIG. 1 is a cross-sectional view schematically illustrating a positive electrode according to one embodiment of the present disclosure.

An embodiment of the present disclosure will be described hereinafter with reference to the drawings. Matters not specifically mentioned herein but required for carrying out the present disclosure can be understood as matters of design variation of a person skilled in the art based on related art in the field. The present disclosure can be carried out on the basis of the contents disclosed in the description and common general knowledge in the field. In the drawings, members and parts having the same functions are denoted by the same reference characters for description. Dimensional relationships (e.g., length, width, and thickness) in the drawings do not reflect actual dimensional relationships. A numerical range expressed as "A to B" herein includes A and B.

A "secondary battery" herein refers to a power storage device capable of being repeatedly charged and discharged, and includes a so-called storage battery and a power storage element such as an electric double layer capacitor. A "lithium ion secondary battery" herein refers to a secondary battery that uses lithium ions as charge carriers and performs charge and discharge by movement of charges accompanying lithium ions between positive and negative electrodes.

The present disclosure will be described in detail hereinafter using a positive electrode for use in a lithium ion secondary battery as an example, but the present disclosure is not intended to be limited to these embodiments. FIG. 1 is a schematic cross-sectional view of a positive electrode according to this embodiment taken along a thickness direction and a width direction.

As illustrated in FIG. 1, a positive electrode 50 includes a positive electrode current collector 52, and a positive electrode active material layer 54 supported by the positive electrode current collector 52. In the illustrated example, the positive electrode active material layer 54 is provided on each surface of the positive electrode current collector 52. Alternatively, the positive electrode active material layer 54 may be provided on one surface of the positive electrode current collector 52. Desirably, the positive electrode active material layer 54 is provided on each surface of the positive electrode current collector 52.

The positive electrode current collector 52 may be a known positive electrode current collector for use in a lithium ion secondary battery, and examples of the positive electrode current collector 52 include sheets or foil of highly conductive metals (e.g., aluminium, nickel, titanium, and stainless steel). The positive electrode current collector 52 is desirably aluminium foil.

Dimensions of the positive electrode current collector 52 are not specifically limited, and may be appropriately determined depending on battery design. In the case of using aluminium foil as the positive electrode current collector 52, the thickness thereof is not specifically limited, and is, for example, 5 μm or more and 35 μm or less, and desirably 7 μm or more and 20 μm or less.

The positive electrode active material layer 54 includes a positive electrode active material. In this embodiment, as the positive electrode active material, at least monoparticulate first Ni-containing lithium composite oxide particles (hereinafter also referred to simply as "first lithium composite oxide particles") and secondary particulate second Ni-containing lithium composite oxide particles (hereinafter also referred to simply as "second lithium composite oxide particles"). Each of the first lithium composite oxide particles and the second lithium composite oxide particles has a layered crystal structure.

Examples of a Ni-containing lithium composite oxide having a layered crystal structure include a lithium nickel composite oxide, a lithium nickel cobalt manganese composite oxide, a lithium nickel cobalt aluminium composite oxide, and a lithium iron nickel manganese composite oxide. The fact that lithium composite oxide particles have a layered crystal structure can be confirmed by a known method (e.g., X-ray diffraction).

The "lithium nickel cobalt manganese composite oxide" herein includes not only oxides including Li, Ni, Co, Mn, and O as constituent elements, but also an oxide further including one or more additive elements besides them. Examples of the additive elements include transition metal elements and typical metal elements such as Mg, Ca, Al, Ti, V, Cr, Y, Zr, Nb, Mo, Hf, Ta, W, Na, Fe, Zn, and Sn. The additive element may be a metalloid element such as B, C, Si, or P, and a nonmetal element such as S, F, Cl, Br, or I. This also applies, in the same manner, to, for example, lithium nickel composite oxide, lithium nickel cobalt aluminium composite oxide, and lithium iron nickel manganese composite oxide described above.

Because of excellent properties such as a small initial resistance, the lithium composite oxide having the layered structure is desirably the lithium nickel cobalt manganese composite oxide. From the viewpoint of a high volume energy density of the nonaqueous electrolyte secondary battery, the content of nickel in the all metal elements except for lithium in the lithium nickel cobalt manganese composite oxide is desirably 50 mol % or more, and more desirably 55 mol % or more. On the other hand, from the viewpoint of high stability, the content of nickel in the all metal elements except for lithium is desirably 88 mol % or less, and more desirably 85 mol % or less.

Specifically, the lithium nickel cobalt manganese composite oxide desirably has the composition expressed by Formula (I):

$$\text{Li}_{1+x}\text{Ni}_y\text{Co}_z\text{Mn}_{(1-y-z)}\text{M}_{60}\text{O}_{2-\beta}\text{Q}_\beta \tag{I}$$

In Formula (I), x, y, z, a, and β respectively satisfy $-0.3 \leq x \leq 0.3$, $0.1 < y < 0.9$, $0 < z < 0.5$, $0 \leq \alpha \leq 0.1$, and $0 \leq \beta \leq 0.5$. M is at least one element selected from the group consisting of Zr, Mo, W, Mg, Ca, Na, Fe, Cr, Zn, Sn, B, and Al. Q is at least one element selected from the group consisting of F, Cl, and Br.

From the viewpoint of a high energy density of the nonaqueous electrolyte secondary battery, y and z desirably satisfy $0.50 \leq y \leq 0.88$ and $0.10 \leq z \leq 0.45$, and more desirably satisfy $0.55 \leq y \leq 0.85$ and $0.10 \leq z \leq 0.40$.

The first lithium composite oxide particles are in a form of monoparticles (i.e., monoparticulate particles). The "monoparticles" herein refer to particles generated with growth of single crystal nuclei, and thus, refer to particles of single crystal including no grain boundary. The state where particles are single crystal can be confirmed by analysis of an electron diffraction image obtained by a transmission electron microscope (TEM), for example.

Monoparticles have the property of having difficulty in agglomeration, and constitute lithium composite oxide particles by themselves, but can be agglomerated to form lithium composite oxide particles in some cases. It should be noted that in the case where monoparticles are agglomerated to form lithium composite oxide particles, the number of agglomerated monoparticles is two or more and ten or less. Thus, one lithium composite oxide particle is constituted by one or more and ten or less monoparticles, can be constituted by one or more and five or less monoparticles, can be constituted by one or more and three or less monoparticles, or can be constituted by one monoparticle. The number of monoparticles in one lithium composite oxide particle can be confirmed by observation with a scanning electron microscope (SEM) at a magnification of 10,000 to 30,000.

Figure 2:
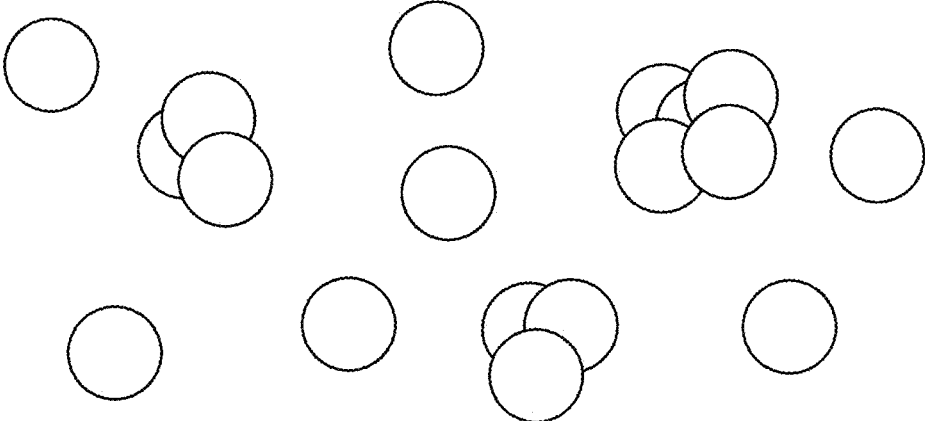
FIG. 2 is a schematic view of monoparticles.
Figure 3:
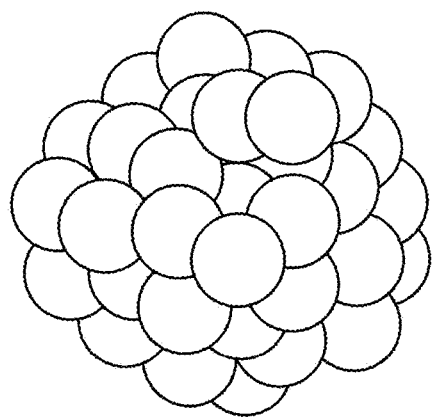
FIG. 3 is a schematic view of secondary particles.

Thus, monoparticles can be schematically illustrated in FIG. 2. FIG. 2 shows isolated particles, and particles as agglomerated particles. On the other hand, secondary particles can be schematically shown as illustrated in FIG. 3. In FIG. 3, a large number of particles are agglomerated to form one particle. Secondary particles are typically constituted by at least 11 or more primary particles. FIGS. 2 and 3 are example, and first lithium composite oxide particles and second lithium composite oxide particles used in this embodiment are not limited to the illustrated particles.

In the manner described above, monoparticles are different from polycrystalline particles constituted by a plurality of crystal grains and secondary particles formed by a large number of agglomerated fine particles (primary particles). A monoparticulate positive electrode active material can be produced with a known method for obtaining single crystalline particles.

In this embodiment, the monoparticulate first lithium composite oxide particles have an average particle size (D50) of 2 μm to 6 μm. It should be noted that the "average particle size (D50) of lithium composite oxide particles" herein refers to a median particle size (D50), and means a particle size corresponding to a cumulative frequency of 50 vol % from the small-size particle side in volume-based particle size distribution based on a laser diffraction and scattering method. Thus, the average particle size (D50) can be obtained by using, for example, a particle size distribution analyzer of a laser diffraction and scattering type.

On the other hand, the second lithium composite oxide particles are secondary particles in which primary particles are agglomerated. Typically, the entire secondary particles (i.e., second lithium composite oxide particles) are filled with primary particles, and can have inner voids derived from gaps between primary particles. The second lithium composite oxide particles have an average primary particle size of 1.2 μm to 2.0 μm. In addition, the second lithium composite oxide particles have an average particle size (D50) of 12 μm to 20 μm.

In this manner, the first lithium composite oxide particles and the second lithium composite oxide particles whose particle sizes are appropriately controlled are used in combination for the positive electrode as positive electrode active materials so that the nonaqueous electrolyte secondary battery can be thereby provided with high gas generation suppressing performance during storage and high cycle characteristics.

Specifically, the feature in which the first lithium composite oxide particles are monoparticles whose average particle size (D50) is 2 μm to 6 μm contributes to enhancement of cycle characteristics and output of the nonaqueous electrolyte secondary battery. The average particle size (D50) of the first lithium composite oxide particles is desirably 3 μm or more. The average particle size (D50) of the first lithium composite oxide particles is desirably 5 μm or less.

The feature in which the second lithium composite oxide particles are secondary particles whose average particle size (D50) is 12 μm to 20 μm contributes to enhancement of filling property of the positive electrode active material layer including the first lithium composite oxide particles and the second lithium composite oxide particles. The average particle size (D50) of the second lithium composite oxide particles is desirably 13 μm to 20 μm, and more desirably 14.5 μm to 18 μm.

In addition, since the second lithium composite oxide particles have an average primary particle size of 1.2 μm or more, occurrence of cracks in the secondary particulate second lithium composite oxide particles can be reduced in press treatment for increasing the density of the positive electrode. If the average primary particle size is smaller than 1.2 μm, cracks of secondary particles increase. In storing the nonaqueous electrolyte secondary battery, decomposition reaction of a nonaqueous electrolyte, which is a side reaction between the lithium composite oxide particles and the nonaqueous electrolyte, is likely to occur in the portion where secondary particles crack, and thus, the amount of gas generation increases due to the portion where secondary particles crack. Thus, the feature in which the average particle sizes (D50) of the first lithium composite oxide particles and the second lithium composite oxide particles are within the ranges described above and the average primary particle size of the second lithium composite oxide particles is 1.2 μm or more, can provide the nonaqueous electrolyte secondary battery with high gas generation suppressing performance during storage.

From the viewpoint of providing higher gas generation suppressing performance, the average primary particle size of the second lithium composite oxide particles is desirably 1.3 μm or more, more desirably 1.5 μm or more, and even more desirably 1.65 μm or more, and most desirably 1.7 μm or more.

On the other hand, if the average primary particle size of the second lithium composite oxide particles is excessively large, the second lithium composite oxide particles are likely to be isolated in charging and discharging the nonaqueous electrolyte secondary battery, and cycle characteristics of the nonaqueous electrolyte secondary battery degrade. For this reason, the average primary particle size of the second lithium composite oxide particles is 2.0 μm or less, desirably 1.9 μm or less, and more desirably 1.8 μm or less.

The "average primary particle size of the second lithium composite oxide particles" denotes an average longer diameter of 50 or more primary particles which are perceived in an electron microscopic cross-sectional image of the second lithium composite oxide particles, and are arbitrarily selected. Thus, the average primary particle size can be obtained by, for example, preparing a cross-sectional observation sample of lithium composite oxide particles by a cross-section polisher process, acquiring an SEM image of the sample with a scanning electron microscope (SEM), and determining longer diameters of 50 or more arbitrarily selected primary particles with image analysis type particle size distribution measurement software (e.g., "Mac-View") to calculate an average value of these longer diameters.

The average primary particle size of the second lithium composite oxide particles can be controlled in the following manner. First, according to a known method, a hydroxide as a precursor of second lithium composite oxide particles is prepared. The hydroxide generally includes metal elements except for lithium in metal elements included in the second lithium composite oxide particles. The hydroxide and a compound (e.g., lithium carbonate) serving as a lithium source are mixed and fired. By adjusting the temperature and time of this firing, the average primary particle size of the second lithium composite oxide particles can be controlled. The firing temperature is desirably 700° C. to 1000° C. The firing time is desirably 3 hours to 7 hours.

The first lithium composite oxide particles and the second lithium composite oxide particles are both lithium composite oxide particles having layered structures, and may have the same or different compositions. Because of excellent properties such as small initial resistance, both of the first lithium composite oxide particles and the second lithium composite oxide particles are desirably particles of a lithium nickel cobalt manganese composite oxide.

From the viewpoint of a high volume energy density, the content of nickel in the all metal elements except for lithium in the lithium nickel cobalt manganese composite oxide is desirably 55 mol % or more in the first lithium composite oxide particles and 50 mol % or more in the second lithium composite oxide particles, and is more desirably 60 mol % or more in the first lithium composite oxide particles and 55 mol % or more in the second lithium composite oxide particles.

A BET specific surface area of the first lithium composite oxide particles is not specifically limited. To provide the nonaqueous electrolyte secondary battery with excellent output characteristics, the BET specific surface area of the first lithium composite oxide particles is desirably 0.50 $m^2/g$ to 0.85 $m^2/g$, and more desirably 0.55 $m^2/g$ to 0.80 $m^2/g$.

The BET specific surface area of the second lithium composite oxide particles is not specifically limited. To provide the nonaqueous electrolyte secondary battery with particularly high gas generation suppressing performance during storage, a BET specific surface area of the second lithium composite oxide particles after pressing the second lithium composite oxide particles into a cylinder shape of Φ19 mm×4.0 mm to 4.5 mm under a load of 70 kN for 30 seconds for molding and then disintegrating the molded particles is desirably 0.48 $m^2/g$ or less, and more desirably 0.47 $m^2/g$ or less. On the other hand, to provide the nonaqueous electrolyte secondary battery with especially high cycle characteristics, the BET specific surface area of the second lithium composite oxide particles after pressing and disintegrating under the conditions described above is desirably 0.41 $m^2/g$ or more and more desirably 0.42 $m^2/g$ or more.

The BET specific surface areas of the first and second lithium composite oxide particles can be measured by a nitrogen adsorption method with a commercially available surface area analyzer (e.g., "Macsorb Model-1208," manufactured by Mountech Co., Ltd.).

The contents of the first lithium composite oxide particles and the second lithium composite oxide particles are not specifically limited. The mass ratio thereof (i.e., first lithium composite oxide particles:second lithium composite oxide particles) is, for example, 10:90 to 90:10, desirably 20:80 to 80:20, more desirably 30:70 to 70:30, and much more desirably 30:70 to 60:40.

The positive electrode active material consists only of the first lithium composite oxide particles and the second lithium composite oxide particles. The positive electrode active material may further include another particles functioning as a positive electrode active material in addition to the first lithium composite oxide particles and the second lithium composite oxide particles.

The positive electrode active material layer 54 may include components other than the positive electrode active material, such as trilithium phosphate, a conductive agent, and a binder. Desired examples of the conductive material include carbon black such as acetylene black (AB) and other carbon materials (e.g., graphite). Examples of the binder include polyvinylidene fluoride (PVDF).

The content of the positive electrode active material in the positive electrode active material layer 54 (i.e., content of the positive electrode active material in the total mass of the positive electrode active material layer 54) is not specifically limited, and is desirably 70 mass % or more, more desirably 80 mass % or more and 99 mass % or less, and much more desirably 85 mass % or more and 98 mass % or less. The content of the conductive material in the positive electrode active material layer 54 is not specifically limited, and is desirably 0.5 mass % or more and 15 mass % or less, and more desirably 1 mass % or more and 10 mass % or less. The content of the binder in the positive electrode active material layer 54 is not specifically limited, and is desirably 0.5 mass % or more and 15 mass % or less, and more desirably 0.8 mass % or more and 10 mass % or less.

The thickness of the positive electrode active material layer 54 is not specifically limited, and is, for example, 10 μm or more and 300 μm or less, and desirably 20 μm or more and 200 μm or less.

The density of the positive electrode active material layer 54 is not specifically limited, and from the viewpoint of especially high volume energy density, is desirably 3.00 $g/cm^3$ to 4.00 $g/cm^3$, more desirably 3.20 $g/cm^3$ to 4.00 $g/cm^3$, even more desirably 3.40 $g/cm^3$ to 4.00 $g/cm^3$, and especially desirably 3.50 $g/cm^3$ to 4.00 $g/cm^3$. As the density of the positive electrode active material layer 54 increases, the pressure of press treatment increases. Accordingly, cracks are more likely to occur in the second lithium composite oxide particles. Thus, as the density of the positive electrode active material layer 54 increases, gas generation suppression during storage is further enhanced.

In a positive electrode active material layer non-formed portion 52a of a positive electrode sheet 50, an insulating protective layer (not shown) including insulating particles (e.g., ceramic particles) may be provided at a location adjacent to the positive electrode active material layer 54. This protective layer can prevent short circuit between the positive electrode active material layer non-formed portion 52a and the negative electrode active material layer 64.

The positive electrode 50 according to this embodiment can be produced by preparing a positive electrode active material layer paste including first lithium composite oxide particles, second lithium composite oxide particles, a solvent (dispersion medium), and when necessary, a binder, a conductive material, and for forth, applying the paste onto the positive electrode current collector 52, drying the paste, and performing press treatment on the dried paste.

The positive electrode according to this embodiment can provide a nonaqueous electrolyte secondary battery with high gas generation suppressing performance during storage and high cycle characteristics (especially high resistance to capacity degradation after repetitive charging and discharging). The positive electrode according to this embodiment is typically a positive electrode for a nonaqueous electrolyte secondary battery, and is desirably a positive electrode for a nonaqueous lithium ion secondary battery. The positive electrode according to this embodiment can also be used as a positive electrode for an all-solid-state secondary battery.

In another aspect, a nonaqueous electrolyte secondary battery according to this embodiment includes a positive electrode, a negative electrode, and a nonaqueous electrolyte, and the positive electrode is the positive electrode according to this embodiment described above.

The nonaqueous electrolyte secondary battery according to this embodiment will now be described using an example of a flat square lithium ion secondary battery including a flat wound electrode body and a flat battery case. The nonaqueous electrolyte secondary battery according to this embodiment, however, is not limited the following examples.

Figure 4:
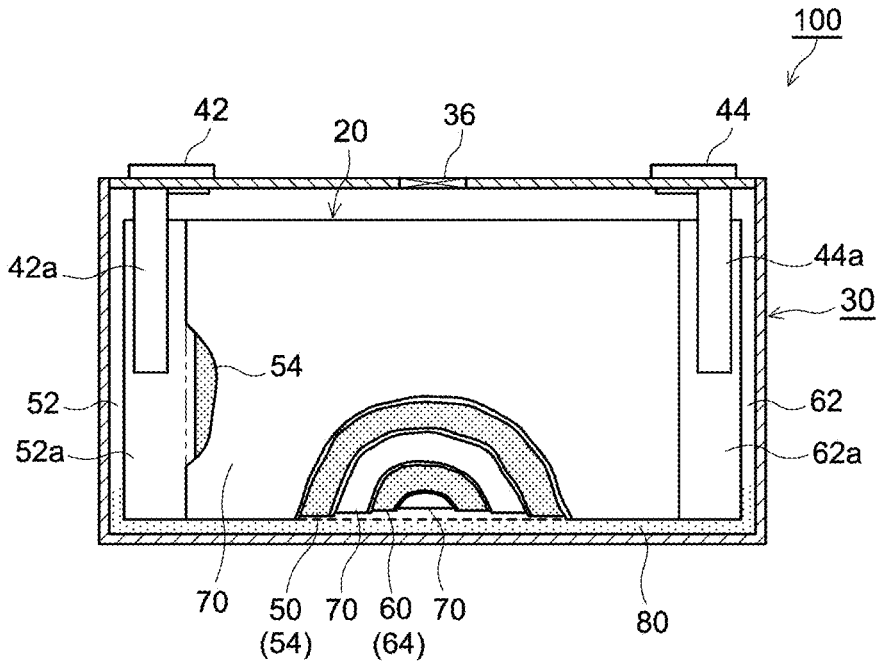
FIG. 4 is a cross-sectional view schematically illustrating an internal structure of a lithium ion secondary battery according to one embodiment of the present disclosure.

A lithium ion secondary battery 100 illustrated in FIG. 4 is a sealed battery in which a flat wound electrode body 20 and a nonaqueous electrolyte (not shown) are housed in a flat square battery case (i.e., outer container) 30. The battery case 30 includes a positive electrode terminal 42 and a negative electrode terminal 44 for external connection, and a thin safety valve 36 configured such that when the internal pressure of the battery case 30 increases to a predetermined level or more, the safety valve 36 releases the internal pressure. The positive and negative electrode terminals 42 and 44 are electrically connected to positive and negative electrode current collector plates 42a and 44a, respectively. A material for the battery case 30 is, for example, a metal material that is lightweight and has high thermal conductivity, such as aluminium. A current interrupt device (CID) may be disposed between the positive electrode terminal 42 and the positive electrode current collector plate 42a or between the negative electrode terminal 44 and the negative electrode current collector plate 44a.

Figure 5:
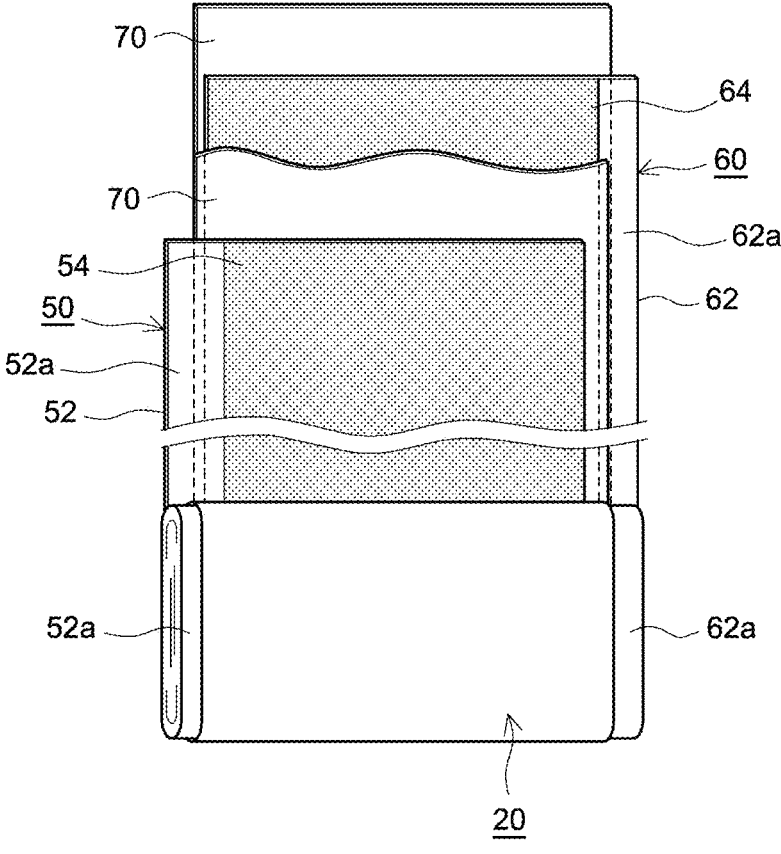
FIG. 5 is a schematic disassembled view illustrating a structure of a wound electrode body of a lithium ion secondary battery according to one embodiment of the present disclosure.

As illustrated in FIGS. 4 and 5, in the wound electrode body 20, a positive electrode sheet 50 and a negative electrode sheet 60 are stacked with two long separator sheets 70 interposed therebetween and wound in the longitudinal direction. In the positive electrode sheet 50, a positive electrode active material layer 54 is formed on one or each (each in this example) surface of a long positive electrode current collector 52 along the longitudinal direction. In the negative electrode sheet 60, a negative electrode active material layer 64 is formed on one or each (each in this example) surface of a long negative electrode current collector 62 along the longitudinal direction.

The positive electrode active material layer non-formed portion 52a (i.e., a portion where no positive electrode active material layer 54 is formed and the positive electrode current collector 52 is exposed) and a negative electrode active material layer non-formed portion 62a (i.e., a portion where no negative electrode active material layer 64 is formed and the negative electrode current collector 62 is exposed) extend off outward from both ends of the wound electrode body 20 in the winding axis direction (i.e., sheet width direction orthogonal to the longitudinal direction). The positive electrode active material layer non-formed portion 52a and the negative electrode active material layer non-formed portion 62a function as current collection portions. The positive electrode current collector plate 42a and the negative electrode current collector plate 44a are respectively joined to the positive electrode active material layer non-formed portion 52a and the negative electrode active material layer non-formed portion 62a. The shapes of the positive electrode active material layer non-formed portion 52a and the negative electrode active material layer non-formed portion 62a are not limited to the illustrated example. The positive electrode active material layer non-formed portion 52a and the negative electrode active material layer non-formed portion 62a may be formed as current collection tabs processed into predetermined shapes.

As the positive electrode sheet 50, the positive electrode 50 according to this embodiment described above is used. In this example, in the positive electrode sheet 50, the positive electrode active material layer 54 is formed on each surface of the positive electrode current collector 52.

As the negative electrode current collector 62 constituting the negative electrode sheet 60, a known negative electrode current collector for use in a lithium ion secondary battery may be used, and examples of the negative electrode current collector include sheets or foil of highly conductive metals (e.g., copper, nickel, titanium, and stainless steel). The negative electrode current collector 62 is desirably copper foil.

Dimensions of the negative electrode current collector 62 are not specifically limited, and may be appropriately determined depending on battery design. In the case of using copper foil as the negative electrode current collector 62, the thickness thereof is not specifically limited, and is, for example, 5 μm or more and 35 μm or less, and desirably 7 μm or more and 20 μm or less.

The negative electrode active material layer 64 includes a negative electrode active material. Examples of the negative electrode active material include carbon materials such as graphite, hard carbon, and soft carbon. Graphite may be natural graphite or artificial graphite, and may be amorphous carbon-coated graphite in which graphite is coated with an amorphous carbon material.

The average particle size (D50) of the negative electrode active material is not specifically limited, and is, for example, 0.1 μm or more and 50 μm or less, desirably 1 μm or more and 25 μm or less, and more desirably 5 μm or more and 20 μm or less. It should be noted that the average particle size (D50) of the negative electrode active material can be determined by, for example, a laser diffraction and scattering method.

The negative electrode active material layer 64 can include components other than the active material, such as a binder or a thickener. Examples of the binder include styrene-butadiene rubber (SBR) and polyvinylidene fluoride (PVDF). Examples of the thickener include carboxymethyl cellulose (CMC).

The content of the negative electrode active material in the negative electrode active material layer 64 is desirably 90 mass % or more, and more desirably 95 mass % or more and 99 mass % or less. The content of the binder in the negative electrode active material layer 64 is desirably 0.1 mass % or more and 8 mass % or less, and more desirably 0.5 mass % or more and 3 mass % or less. The content of the thickener in the negative electrode active material layer 64 is desirably 0.3 mass % or more and 3 mass % or less, and more desirably 0.5 mass % or more and 2 mass % or less.

The thickness of the negative electrode active material layer 64 is not specifically limited, and is, for example, 10 μm or more and 300 μm or less, and desirably 20 μm or more and 200 μm or less.

Examples of the separator 70 include a porous sheet (film) of a resin such as polyethylene (PE), polypropylene (PP), polyester, cellulose, and polyamide. The porous sheet may have a single-layer structure or a laminated structure of two or more layers (e.g., three-layer structure in which PP layers are stacked on both surfaces of a PE layer). A heat-resistance layer (HRL) may be provided on a surface of the separator 70.

A nonaqueous electrolyte 80 typically includes a nonaqueous solvent and a supporting electrolyte (electrolyte salt). As the nonaqueous solvent, various organic solvents such as carbonates, ethers, esters, nitriles, sulfones, and lactones for use in an electrolyte of a typical lithium ion secondary battery can be used without any particular limitation. Specific examples of such a nonaqueous solvent include ethylene carbonate (EC), propylene carbonate (PC), diethyl carbonate (DEC), dimethyl carbonate (DMC), ethyl methyl carbonate (EMC), monofluoroethylene carbonate (MFEC), difluoroethylene carbonate (DFEC), monofluoromethyl difluoromethyl carbonate (F-DMC), and trifluorodimethyl carbonate (TFDMC). Such nonaqueous solvents may be used alone or two or more of them may be used in combination.

Desired examples of the supporting electrolyte include lithium salts (desirably $LiPF_6$) such as $LiPF_6$, $LiBF_4$, and lithium bis(fluorosulfonyl)imide (LiFSI). The concentration of the supporting electrolyte is desirably 0.7 mol/L or more and 1.3 mol/L or less.

The nonaqueous electrolyte 80 may include components not described above, for example, various additives exemplified by: a film forming agent such as vinylene carbonate (VC) and an oxalato complex; a gas generating agent such as biphenyl (BP) or cyclohexylbenzene (CHB); and a thickener, to the extent that the effects of the present disclosure are not significantly impaired.

The thus-configured lithium ion secondary battery 100 has high gas generation suppressing performance during storage and high cycle characteristics. The lithium ion secondary battery 100 is applicable to various applications. Specific examples of application of the lithium ion secondary battery 100 include: portable power supplies for personal computers, portable electronic devices, portable terminals, and other devices; vehicle driving power supplies for vehicles such as electric vehicles (BEVs), hybrid electric vehicles (HEVs), and plug-in hybrid electric vehicles (PHEVs); and storage batteries for small power storage devices, and among these devices, vehicle driving power supplies are especially desirable. The lithium ion secondary battery 100 can be used in a battery pack in which a plurality of batteries are typically connected in series and/or in parallel.

The foregoing description is directed to the square lithium ion secondary battery 100 including the flat wound electrode body 20 as an example. Alternatively, the nonaqueous electrolyte secondary battery disclosed here can also be configured as a lithium ion secondary battery including a stacked-type electrode body (i.e., electrode body in which a plurality of positive electrodes and a plurality of negative electrodes are alternately stacked). The stacked-type electrode body may include a plurality of separators each interposed between one positive electrode and one negative electrode or may include one separator in such a manner that positive electrodes and negative electrodes are alternately stacked with one separator being repeatedly folded.

The nonaqueous electrolyte secondary battery disclosed here may be configured as a coin type lithium ion secondary battery, a button type lithium ion secondary battery, a cylindrical lithium ion secondary battery, or a laminated case type lithium ion secondary battery. The nonaqueous electrolyte secondary battery disclosed here may be configured as a nonaqueous electrolyte secondary battery other than a lithium ion secondary battery, by a known method.

On the other hand, the positive electrode according to this embodiment can be used for constituting an all-solid-state secondary battery (especially all-solid-state lithium ion secondary battery) according to a known method by using a solid electrolyte instead of the nonaqueous electrolyte 80.

Examples of the present disclosure will now be described, but are not intended to limit the present disclosure to these examples.

Example 1

As first lithium composite oxide particles, monoparticulate $LiNi_{0.6}Co_{0.2}Mn_{0.2}O_2$ having an average particle size (D50) of 3.9 μm and a BET specific surface area of 0.60 $m^2/g$ was prepared. As second lithium composite oxide particles, secondary particulate $LiNi_{0.55}Co_{0.20}Mn_{0.25}O_2$ having an average primary particle size of 1.8 μm, an average particle size (D50) of 16.5 μm, and a BET specific surface area of 0.20 $m^2/g$ was prepared. It should be noted that the average primary particle size, the average particle size (D50), and the BET specific surface area were measured by a method described later.

The first lithium composite oxide particles and the second lithium composite oxide particles were mixed in a mass ratio of 50:50, thereby preparing a positive electrode active material. This positive electrode active material, carbon black as a conductive agent, and polyvinylidene fluoride (PVDF) as a binder were mixed in a mass ratio of positive electrode active material:AB:PVDF=97.5:1.5:1.0. The resulting mixture was supplemented with an appropriate amount of N-methyl-2-pyrrolidone (NMP), thereby preparing positive electrode active material layer slurry.

The positive electrode active material layer slurry was applied to both surfaces of a positive electrode current collector of aluminium foil, and dried, thereby forming a positive electrode active material layer. The positive electrode active material layer was roll-pressed by rolling rollers to have a density of 3.50 $g/cm^3$, and then cut into a predetermined size, thereby obtaining a positive electrode sheet.

Graphite (C) as a negative electrode active material, styrene butadiene rubber (SBR) as a binder, and carboxymethyl cellulose (CMC) as a thickener were mixed in ion-exchanged water in a mass ratio of C:SBR:CMC=98:1:1, thereby preparing negative electrode active material layer slurry. This negative electrode active material layer slurry was applied onto copper foil and then dried, thereby forming a negative electrode active material layer. The negative electrode active material layer was roll-pressed to have a predetermined density by rolling rollers, and then cut into a predetermined size, thereby obtaining a negative electrode sheet.

As a separator, a porous polyolefin sheet was prepared. The positive electrode sheets and the negative electrode sheets were alternately stacked with separators interposed therebetween, thereby obtaining a stacked-type electrode body.

Electrode terminals were attached to the stacked-type electrode body, and the resultant was inserted in a battery case constituted by an aluminium laminated sheet. A nonaqueous electrolyte was injected into the battery case. The nonaqueous electrolyte used was obtained by dissolving $LiPF_6$ as a supporting electrolyte at a concentration of 1 mol/L in a mixed solvent including ethylene carbonate (EC) and ethyl methyl carbonate (EMC) in a volume ratio of EC:EMC=30:70 and adding 0.3 mass % of vinylene carbonate to the resulting solvent mixture. Thereafter, the battery case was sealed, thereby obtaining an evaluation lithium ion secondary battery of Example 1.

Examples 2 and 3 and Comparative Examples 1 to 6

Evaluation lithium ion secondary batteries were produced by the same method as Example 1 except for using second lithium composite oxide particles having an average primary particle size, an average secondary particle size (D50), and a BET specific surface area shown in Table 1. It should be noted that the average primary particle size of the second lithium composite oxide particles was adjusted by changing firing conditions of a mixture of precursor hydroxide (i.e., $Ni_{0.55}Co_{0.20}Mn_{0.25}(OH)_2$) and a compound serving as a lithium source in producing the second lithium composite oxide particles.

<Measurement of Average Particle Size (D50) of First and Second Lithium Composite Oxide Particles>

Volume-based particle size distributions of first and second lithium composite oxide particles were measured with a commercially available laser diffraction and scattering particle size distribution analyzer, and a particle size corresponding to a cumulative frequency of 50 vol % from the small-size particle side was determined as an average particle size (D50) of first and second lithium composite oxide particles.

<Measurement of Average Primary Particle Diameter of Second Lithium Composite Oxide Particles>

A cross-sectional observation sample of second lithium composite oxide particles was produced by a cross-section polisher process. An SEM image of this sample was obtained by using a scanning electron microscope (SEM). Longer diameters of 50 or more randomly selected primary particles were obtained with image analysis type particle size distribution measurement software "Mac-View." An average of the obtained longer diameters was calculated and employed as an average primary particle size of second lithium composite oxide particles.

<Measurement of BET Specific Surface Areas of First and Second Lithium Composite Oxide Particles>

BET specific surface areas of the first and second lithium composite oxide particles were measured by a nitrogen adsorption method with a commercially available surface area analyzer ("Macsorb Model-1208" manufactured by Mountech Co., Ltd.).

<Cycle Characteristic Evaluation>

As initial charging, each evaluation lithium ion secondary battery was charged to 4.25 V with a constant current at a current density of 0.2 mA/cm² under a temperature envimA/cm², and then charged with a constant voltage until the current density reaches 0.04 mA/cm². Thereafter, each evaluation lithium ion secondary battery was discharged with a constant current to 3.48 V at a current density of 0.2 mA/cm². A discharge capacity at this time was obtained. This charging and discharging process was defined as one cycle, and 400 cycles of the charging and discharging process were repeatedly performed on each evaluation lithium ion secondary battery. A discharge capacity at the 400th cycle was obtained. From (discharge capacity at 400th cycle of charging and discharging process/discharge capacity at first cycle of charging and discharging process)×100, a capacity retention rate (%) was obtained as an index of cycle characteristics. Table 1 shows results.

<Evaluation of Gas Generation Amount During Storage>

Each evaluation lithium ion secondary battery was charged to 4.25 V with a constant current at a current density of 0.2 mA/cm² under a temperature environment of 25° C., and then charged with a constant voltage of 4.25 V until the current density reaches 0.04 mA/cm². Each evaluation lithium ion secondary battery was rested for 10 minutes, and then discharged with a constant current to 3.0 V at a current density of 0.2 mA/cm². A gas amount at this time was obtained, and used as a gas amount before storage.

Next, each evaluation lithium ion secondary battery was charged to 4.25 V with a constant current at a current density of 0.2 mA/cm² under a temperature environment of 25° C., and then charged with a constant voltage of 4.25 V until the current density reaches 0.04 mA/cm². Each evaluation lithium ion secondary battery was stored for 60 days in a thermostat at 60° C. Each evaluation lithium ion secondary battery was discharged with a constant current to 3.0 V at a current density of 0.2 mA/cm², and then a gas amount was obtained and used as a gas amount after storage.

From a difference between gas amount after storage and gas amount before storage, a gas generation amount was obtained. Thereafter, ratios of gas generation amounts of other examples and comparative examples to that of Example 1 were determined in a case where a gas generation amount in Example 1 is taken as 100. Table 1 shows results.

TABLE 1

| | Second lithium composite oxide particles | | | | | |
| --- | --- | --- | --- | --- | --- | --- |
| | Average primary particle size (μm) | D50 (μm) | BET specific surface area before press treatment (m²/g) | BET specific surface area after pressing (m²/g) | Gas generation amount ratio after storage | Capacity retention rate (%) |
| Comparative Example 1 | 2.6 | 17.8 | 0.14 | 0.39 | 76 | 89 |
| Comparative Example 2 | 2.4 | 18.2 | 0.13 | 0.40 | 81 | 90 |
| Example 1 | 1.8 | 16.5 | 0.20 | 0.45 | 100 | 93 |
| Example 2 | 1.5 | 17.6 | 0.14 | 0.42 | 106 | 94 |
| Example 3 | 1.3 | 17.5 | 0.10 | 0.47 | 108 | 93 |
| Comparative Example 3 | 1.0 | 17.5 | 0.14 | 0.58 | 122 | 93 |
| Comparative Example 4 | 0.9 | 18.0 | 0.14 | 0.55 | 166 | 93 |
| Comparative Example 5 | 0.7 | 17.8 | 0.16 | 0.50 | 177 | 93 |
| Comparative Example 6 | 0.6 | 18.0 | 0.19 | 0.49 | 184 | 93 | ronment of 25° C., and then charged with a constant voltage of 4.25 V until the current density reaches 0.04 mA/cm². Each evaluation lithium ion secondary battery was rested for 10 minutes, and then discharged with a constant current to 3.0 V at a current density of 0.2 mA/cm².

Each evaluation lithium ion secondary battery was placed under a temperature environment of 25° C., charged with a constant current to 4.18 V at a current density of 0.2

From the result of Table 1, in the case of using monoparticulate first lithium composite oxide particles and secondary particulate second lithium composite oxide particles in combination, it was found that as the average primary particle size of the second lithium composite oxide particles increases, the gas generation amount after storage decreases.

Here, 4 g of the second lithium composite oxide particles used in the examples and the comparative examples was used, and molded into a cylinder shape of Φ19 mm×4.0 mm to 4.5 mm by pressing for 30 seconds under a load of 70 kN (i.e., pressure with which the density of the positive electrode active material layer reaches 3.50 g/cm³), and then the molded particles were disintegrated to obtain a sample. A BET specific surface area of this sample was measured. Table 1 shows results. The BET specific surface areas in Comparative Examples 1 and 2 and Examples 1 to 3 were smaller than those of Comparative Examples 3 to 6. This shows that frequency of cracking of secondary particles has decreased in Comparative Examples 1 and 2 and Examples 1 to 3. Thus, it is found that occurrence of cracking of secondary particles is significantly related to the gas generation amount after storage.

On the other hand, in Comparative Examples 1 and 2 in each of which the average primary particle size of the second lithium composite oxide particles was 2.4 μm or more, the capacity retention rate decreased, and cycle characteristics degraded. For the foregoing reasons, it can be understood that in the case where the average primary particle size of the second lithium composite oxide particles is 1.2 μm to 2.0 μm, both reduction of gas generation during storage and high cycle characteristics can be achieved.

Thus, it can be understood that the positive electrode disclosed here can provide the nonaqueous electrolyte secondary battery with high gas generation suppressing performance during storage and high cycle characteristics.

Specific examples of the present disclosure have been described in detail hereinbefore, but are merely illustrative examples, and are not intended to limit the scope of claims. The techniques described in claims include various modifications and changes of the above exemplified specific examples.

What is claimed is:

1. A positive electrode, comprising:
a positive electrode current collector; and
a positive electrode active material layer supported by the positive electrode current collector, wherein
the positive electrode active material layer includes
monoparticulate first Ni-containing lithium composite oxide particles, and
secondary particulate second Ni-containing lithium composite oxide particles,
the first Ni-containing lithium composite oxide particles and the second Ni-containing lithium composite oxide particles have layered crystal structures,
the first Ni-containing lithium composite oxide particles have an average particle size (D50) of 2 μm to 6 μm,
the second Ni-containing lithium composite oxide particles have an average primary particle size of 1.2 μm to 2.0 μm,
the second Ni-containing lithium composite oxide particles have an average particle size (D50) of 12 μm to 20 μm, and
the second Ni-containing lithium composite oxide particles have a BET specific surface area of 0.41 m²/g or more and 0.48 m²/g or less when the second Ni-containing lithium composite oxide particles are press-molded for 30 seconds under a load of 70 kN into a cylinder shape of Φ 19 mm×4.0 mm to 4.5 mm and then disintegrated.

2. The positive electrode according to claim 1, wherein the positive electrode active material layer has a density of 3.00 g/cm³ to 4.00 g/cm³.

3. The positive electrode according to claim 1, wherein each of the first Ni-containing lithium composite oxide particles and the second Ni-containing lithium composite oxide particles is particles of a lithium nickel cobalt manganese composite oxide.

4. The positive electrode according to claim 3, wherein a content of nickel in all metal elements except for lithium in the lithium nickel cobalt manganese composite oxide is 50 mol % or more.

5. A nonaqueous electrolyte secondary battery, comprising:
a positive electrode including
a positive electrode current collector, and
a positive electrode active material layer supported by the positive electrode current collector;
a negative electrode; and
a nonaqueous electrolyte, wherein
the positive electrode active material layer includes
monoparticulate first Ni-containing lithium composite oxide particles and secondary particulate second Ni-containing lithium composite oxide particles,
the first Ni-containing lithium composite oxide particles and the second Ni-containing lithium composite oxide particles have layered crystal structures,
the first Ni-containing lithium composite oxide particles have an average particle size (D50) of 2 μm to 6 μm,
the second Ni-containing lithium composite oxide particles have an average primary particle size of 1.2 μm to 2.0 μm,
the second Ni-containing lithium composite oxide particles have an average particle size (D50) of 12 μm to 20 μm, and
the second Ni-containing lithium composite oxide particles have a BET specific surface area of 0.41 m²/g or more and 0.48 m²/g or less when the second Ni-containing lithium composite oxide particles are press-molded for 30 seconds under a load of 70 kN into a cylinder shape of Φ 19 mm×4.0 mm to 4.5 mm and then disintegrated.

6. The positive electrode according to claim 1, wherein one or more of the second Ni-containing lithium composite oxide particles having the BET specific surface area of 0.41 m²/g or more and 0.48 m²/g or less are cracked.

7. The nonaqueous electrolyte secondary battery according to claim 5, wherein one or more of the second Ni-containing lithium composite oxide particles having the BET specific surface area of 0.41 m²/g or more and 0.48 m²/g or less are cracked.

* * * * *